(12) United States Patent
Shubinsky et al.

(10) Patent No.: US 9,076,048 B2
(45) Date of Patent: Jul. 7, 2015

(54) BIOMETRIC IDENTIFICATION, AUTHENTICATION AND VERIFICATION USING NEAR-INFRARED STRUCTURED ILLUMINATION COMBINED WITH 3D IMAGING OF THE HUMAN EAR

(71) Applicants: Gary David Shubinsky, Buffalo Grove, IL (US); Alan Sobel, Ann Arbor, MI (US)

(72) Inventors: Gary David Shubinsky, Buffalo Grove, IL (US); Alan Sobel, Ann Arbor, MI (US)

( * ) Notice: Subject to any disclaimer, the term of this patent is extended or adjusted under 35 U.S.C. 154(b) by 303 days.

(21) Appl. No.: 13/786,696

(22) Filed: Mar. 6, 2013

(65) Prior Publication Data

US 2013/0236066 A1    Sep. 12, 2013

Related U.S. Application Data (60) Provisional application No. 61/607,243, filed on Mar. 6, 2012, provisional application No. 61/616,141, filed on Mar. 27, 2012.

(51) Int. Cl.
*G06K 9/00* (2006.01)
(52) U.S. Cl.
CPC ........ *G06K 9/00885* (2013.01); *G06K 9/00899* (2013.01)
(58) Field of Classification Search
CPC .... G07C 9/00158; G06F 21/32; A61B 5/117; A61B 5/6816; G06K 9/00362; G06K 9/00885; G06K 9/00892; H04L 63/0861; H04L 9/3231
See application file for complete search history.

(56) References Cited

U.S. PATENT DOCUMENTS

2007/0183633 A1\*   8/2007   Hoffmann .................... 382/116

OTHER PUBLICATIONS

A. Pflug C. Busch, Ear biometrics: a survey of detection, feature extraction and recognition methods, Nov. 2011.\*
B. Takacs et al., "Detection of faces and facial landmarks using iconic filter banks," Pattern Recognition, vol. 30, No. 10, pp. 1623-1636 (1997).
P. Belhumeur et al., "Eigenfaces vs. fisherfaces: Recognition using class-specific linear projection," IEEE Trans. Pattern Analysis and Machine Intelligence, vol. 19, No. 7, pp. 711-720 (1997).
M. Kass et al., "Snakes: Active contour models," International Journal of Computer Vision, 1(4):321-331 (1987).
K. Zuiderveld, "Graphics Gems IV," Chap entitled Contrast limited adaptive histogram qualization, pp. 474-485, Academic Press Professional, Inc. (1994).

\* cited by examiner

*Primary Examiner* — Mark Roz
(74) *Attorney, Agent, or Firm* — Gifford, Krass, Sprinkle, Anderson & Citkowski, P.C.; Douglas L. Wathen (57) ABSTRACT

A biometric identification or authentication images an ear of the user. A source of near-infrared structured light illuminates the ear with at least one structured pattern and an image acquisition device captures a near-infrared image of an ear illuminated with a structured pattern of near-infrared light. An analysis area of the near-infrared image is processed to extract identifying features and it is determined if the identifying features correspond to an authorized user. The analysis area of the near-infrared image is processed to determine a reflectivity of the ear and it is determined if the reflectivity corresponds to an ear of a living person. The user is authenticated if the classified identifying features correspond to an authorized user and the reflectivity corresponds to an ear of a living person.

8 Claims, 4 Drawing Sheets

BIOMETRIC IDENTIFICATION, AUTHENTICATION AND VERIFICATION USING NEAR-INFRARED STRUCTURED ILLUMINATION COMBINED WITH 3D IMAGING OF THE HUMAN EAR

CROSS REFERENCE TO RELATED APPLICATIONS

This U.S. patent application claims priority to U.S. provisional patent application Ser. No. 61/607,243, filed Mar. 6, 2012, and Ser. No. 61/616,141, filed Mar. 27, 2012, the contents of both of which are incorporated herein in their entirety.

FIELD OF THE INVENTION

This invention provides a device and method for biometric identification, authentication and verification of a person by using structured near-infrared illumination in combination with image acquisition and processing to recognize and analyze key features of a human ear. The device and method may be used as a personal identification for financial transactions, e-commerce, restricted or confidential information access, control access to a place, or any other application that requires secure authentication and identification. The device and method can be used as a stand-alone personal identification system or as a part of multi modal system where it is combined with other biometric identification methods.

BACKGROUND OF THE INVENTION

Biometrics deals with recognition of individuals based on their physiological or behavioral characteristics. The current practice for biometric identification is to use a single mode or multi-mode biometric methods such as: fingerprints, palm prints, face recognition, iris recognition, vein recognition, gait or other bodily characteristics. These methods have significant limitations, including unacceptable False Acceptance Rates and False Rejection Rates. Some of these methods are strongly affected by environmental lighting conditions, others by aging effects, physical conditions, cosmetics, etc. or can be easily fooled or deceived by a substitution. Most of these methods require direct human interaction, which brings additional inconsistencies and errors into the identification process. As an example facial recognition is significantly more complicated because of the size and complexity of human faces. Uncontrolled environmental factors are always associated with facial recognition, such as varying lighting conditions. Additionally, a face may appear at different scales, positions and orientations. Facial expressions significantly differ due to facial hair, make-up, tattoos and glasses. In case of fingerprints, Japanese researchers were able to lift fingerprints from glass and to fool fingerprint scanners using fake fingers made from household ingredients. Iris recognition, based on imaging and analysis of colored protein of the eye, is widely used at border control in countries such as the United States, United Arab Emirates and the United Kingdom, but strongly affected by aging.

With today's e-commerce, information-rich environment, and global computer and information networks, one of the critical needs is to ensure that only authorized individuals gain access to critical devices, restricted or confidential information, or proprietary data. With the availability of ready-to-use "sniffers" and access code (password/PIN) cracking tools, the standard password, passcodes, or PIN combinations are no longer adequate for secure personal identification and authentication. Even sophisticated users of sensitive and proprietary information networks not only fail to change their passwords or PINs, but also assign the same value to all their online access codes. For current and future information networks, it is critical to establish the most reliable security capabilities to establish identity and allow only authorized access to information assets. There is also a need for data integrity, to ensure that no unauthorized changes have been made to the sensitive, private, or restricted information; confidentiality, to restrict information or network access strictly to authorized individual(s); and nonrepudiation, to ensure authorized users do not disavow actual authorized access.

During the last decade, there has been significant demand for development of reliable biometrical authentication for security applications, i.e. verification or identification of a person by using biometrical features. The most commonly used method for authentication is the presentation of a Personal Identification Number (PIN) or a password. Significantly more reliable protection against unauthorized use can be achieved, however, via implementation of biometrical authentication applied as an addition or as an alternative to the knowledge-based authentication methods. Biometric authentication methods have the general advantage over knowledge-based methods in that it is not possible to give the biometric feature to someone else (either intentionally or unintentionally). A password can be given to another person and can be used in the same way as the legal owner, but a biometric feature can only be used by the legal owner. Static biometric features have the critical advantage that they cannot be lost or forgotten because they are always present with a person.

An ideal biometric solution must satisfy many, often competing, criteria. Accuracy is one criterion. A low false acceptance rate (FAR) is crucial to security; it is critical that unauthorized individuals are not misidentified as authorized. The FAR depends on several factors, such as the distinctiveness of the chosen biometric between individuals (essentially, its uniqueness), the ability to capture the biometric information accurately, and the ability to match it correctly. From this point of view, the iris is a good biometric; there is a high degree of randomness and complexity in iris patterns that underpins its uniqueness and distinctiveness between individuals. However, the FAR covers only one side of accuracy. The false rejection rate (FRR—incorrectly rejecting individuals who are actually authorized) also matters. Most currently used or proposed biometric identification methods present a compromise in areas of security, accuracy, practicality or resistance to forgery.

SUMMARY OF THE INVENTION

The uniqueness of the ear morphology has been documented for many years, but so far there has been no announced device to acquire this information. Ear-based biometric identification and authentication offers an additional advantage because individual ear geometry and features do not change throughout the life span of an individual.

Disclosed herein is a method and equipment for ear-based biometric identification, authentication and verification of a person by using structured, near-infrared illumination in combination with image acquisition and processing to recognize and analyze a human ear. The ear is illuminated with a pattern of structured infrared light, typically a grid of horizontal and/or vertical lines. If this grid were projected onto a plane, the result would be a simple light pattern. Because the ear is not a plane, the grid is distorted, and these image distortions are directly related to the 3D (three dimensional) geometry of an object. Structured illumination, using a visible spectrum of light, is an established technology, which is widely used for industrial metrology, and non-destructive testing.

Equipment in accordance with certain embodiments of the present invention includes two modules: an illumination module and an image acquisition module. In the product implementation, these two modules can be integrated as a single device or it can be implemented as a two separate modules. The illumination module generates a near infrared illumination of an area (general area which surrounds the human ear, including the ear) and a structured light pattern or patterns in the near-infrared region, using an near-infrared laser, near-infrared laser diodes, or near-infrared light-emitting diodes (LED), gas-discharge or an incandescent light sources used with additional fixed or dynamic optical elements (such as DLP—digital light processing). A fixed optical element may be a lens, lens arrangement, diffraction gratings, fiber optic elements, lens with slits, or masks or similar devices for creating a fixed structured light pattern. A dynamic optical element may use digital light processing (DLP) or other light-modulating elements. The primary advantage of using infrared illumination is that it is not affected by the ambient light. As such, the system can be used in full sunlight or in complete darkness—the final outcome of the biometric scan is not hindered. Also, infrared illumination is invisible to the naked eye and therefore not disturbing to a human under biometric scan. Additionally, there are special characteristics of human skin (such as reflectivity) that can be used as an additional differentiation and identification parameters. The present invention allows the use of particular spectral regions or combinations of spectral regions, increasing the security of the authentication. The illumination may consist of a single pulse or pulses of near-infrared illumination, near-infrared illumination at particular time frequency (pulse rate or time domain pattern), or a combination of time frequencies. The use of a pulse rate or time domain pattern may allow better recovery of a low level signal, and may also provide additional security since mimicking or defeating the system would require knowledge of the time domain pattern used.

In some embodiments, visible light in the region of 450 to 700 nanometers can be used in addition to the infrared structured illumination to distinguish other features of skin texture and pigmentation.

The energy emitted in infrared or visible light is measured in microwatts and will not damage human eyes or any part of the person being scanned. Commercially available imaging sensors, based on CCD, CID or similar technologies are adequately sensitive and have sufficient resolution for the present application. Alternative infrared imaging arrays (Microbolometer, Indium Gallium Arsenide (InGaAs), Indium Antimonide (InSb) or similar imaging arrays also can be used for this application.

The resulting image is subjected to a post-acquisition image processing analysis using software programs. The outcome of this program provides final biometric identification which delivers unambiguous identification of the subject (ear). In addition to identification of a 3D profile of a human ear. The inventive system will also provide information regarding skin reflectivity. This information provides additional "soft" biometric information which will further improve accuracy and reliability of the biometric identification and authentication. For example, if the ear being examined is a plastic model on a mannequin, the reflectivity under near-infrared illumination will be significantly different compared to the reflectivity of the human skin.

The use of structured infrared illumination for determining 3D morphology of an ear for the purpose of personal identification and authentication is unique.

The equipment required to provide the image includes the illumination module, which has a source (or sources) of infrared structured illumination and associated illumination optics, and the imaging module which will include an imaging sensor and imaging optics. These components can all be packaged in a small case or embedded in another device such as a computer, tablet, mobile phone, stand-alone security scan station, rugged hand-held field devices etc. The power requirement is low enough that battery operation is feasible.

If the equipment is used in conjunction with a computer or computer terminal, it can be mounted on the computer and can draw its power from the computer. If it is used in conjunction with a gate or portal, it can be integrated within that structure, or it can be an integral part of a hand-held device. The equipment can transmit information captured to the computer by wire or by wireless means, thus be a part of a local or global multi-modal security network.

Certain embodiments of the present invention provide a method of biometric identification and authentication of a user by imaging of an ear of the user. In accordance with this method, a biometric imaging system is provided. The system includes a source of near-infrared structured light operable to provide a near—the-ear area illumination and at least one structured pattern of near-infrared light, an image acquisition device operable to capture an ambient light image and operable to capture a near-infrared image of an ear illuminated with a structured pattern of near-infrared light, and a support holding the sources and the acquisition device. An ambient light image, including the ear, is acquired using the image acquisition device. The ambient light image is processed to define an analysis area including the ear. The ear is illuminated with a first structured pattern of near-infrared light from the source of structured light, the structured pattern of near-infrared light being a periodic pattern of spaced apart lines of near-infrared illumination. A first near-infrared image of the illuminated ear is acquired using the image acquisition device. The analysis area of the near-infrared image is processed to extract identifying features and it is determined if the identifying features correspond to an authorized user. The analysis area of the near-infrared image is processed to determine a reflectivity of the ear and it is determined if the reflectivity corresponds to an ear of a living person. The user is authenticated if the classified identifying features correspond to an authorized user and the reflectivity corresponds to an ear of a living person.

DETAILED DESCRIPTION OF THE INVENTION

The ear is a unique and stable biometric subject that is invariant from childhood to old age (8 to 70) and can be used to easily and reliably identify a person. It is an integral part of the body, so it is not amenable to easy modification. The ear is not affected by facial expressions, cosmetics or eyeglasses and has important properties, such as universality, uniqueness and permanence. In addition to color differentiation, the human ear consists of several unique parts: 1. Helix Rim, 2. Lobule, 3. Triangular Fossa, 4. Cannal Interguiano, 5. Conch, 6. Crus of Helix, 7. Tragus, 8. Antihelix, and 9. Antritragus. The most famous work among ear identification was made by Alfred Iannarelli when he collected information on over ten thousands ears and found that all were different. In a set of 500 ears, only four characteristics were needed to identify the ears as being unique. Even identical twins had similar, but not identical, ear physiological features. Most of the literature findings indicate that human ears are so unique that highly reliable personal authentication can be achieved using only a limited number of features or characteristics.

The present invention provides an apparatus and method for biometric identification, authentication and/or verification of a person via combining near-infrared area (near-the-ear-region) and a structured illumination combined with image processing and 3D human ear recognition. This technique is non-contact, non-invasive, and offers almost complete immunity to ambient light conditions. The uniqueness of ear morphology has been documented for many years, but so far there has been no devices or methods that make use of this.

The present invention provides a method and equipment to reliably and robustly identify, authenticate and verify a person using infrared structure illumination of the ear and image processing. An ear of a user is illuminated with a pattern of near-infrared structured illumination, typically a grid of horizontal and/or vertical lines. An image acquisition system is used to capture a near-infrared image of the illuminated ear. This image is then processed to extract identifying features. The user can then be identified and/or authenticated by determining if the identifying features correspond to a predefined user. In some versions, the near-infrared illumination and imaging is preceded or accompanied by imaging the ear with ambient light, and processing this image to locate the ear and define an analysis area including the ear. Also in some versions, the near-infrared image of the ear is processed to determine the reflectivity of the ear, to determine if the ear is on a living person and corresponds to a predefined individual.

Figure 1:
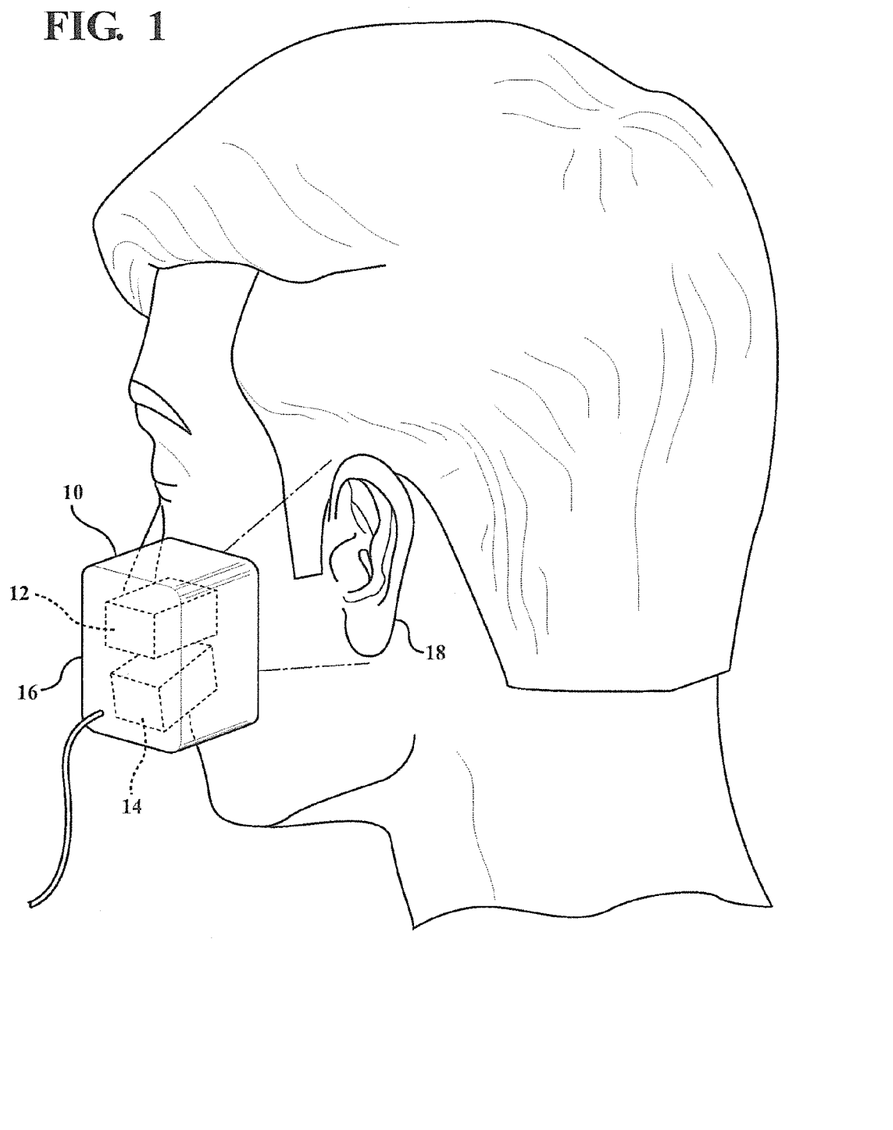
FIG. 1 is a perspective view of an embodiment of an apparatus for biometric identification in accordance with the present invention.

Referring to FIG. 1, a biometric imaging system is generally shown at 10. The system includes a source of near-infrared structured illumination 12 and an image acquisition device 14 both disposed in a housing 16. The system 10 is located at a position where it has a view of the ear 18 of a user. The source of near-infrared structured illumination 12 may also be a source of ambient light to allow an ambient light image to be captured. Alternatively, a separate ambient light source may be provided, or existing ambient light may be sufficient for an ambient light image. Likewise, the image acquisition device 14 may function to capture an ambient light image in addition to a near-infrared image. The system 10 is shown larger than preferred, in order to show the component parts. In one preferred, version, the system is about half the size of a smart phone. The distance between the system 10 and the ear may also be different than shown. In one example, the preferred imaging distance is in the range of 1 to 2 feet, though closer and farther imaging distances may be used. In another example, the range is from about five inches to several feet. Closer ranges are possible, but this presents certain challenges with the design of the optics and imaging elements.

Figure 2:
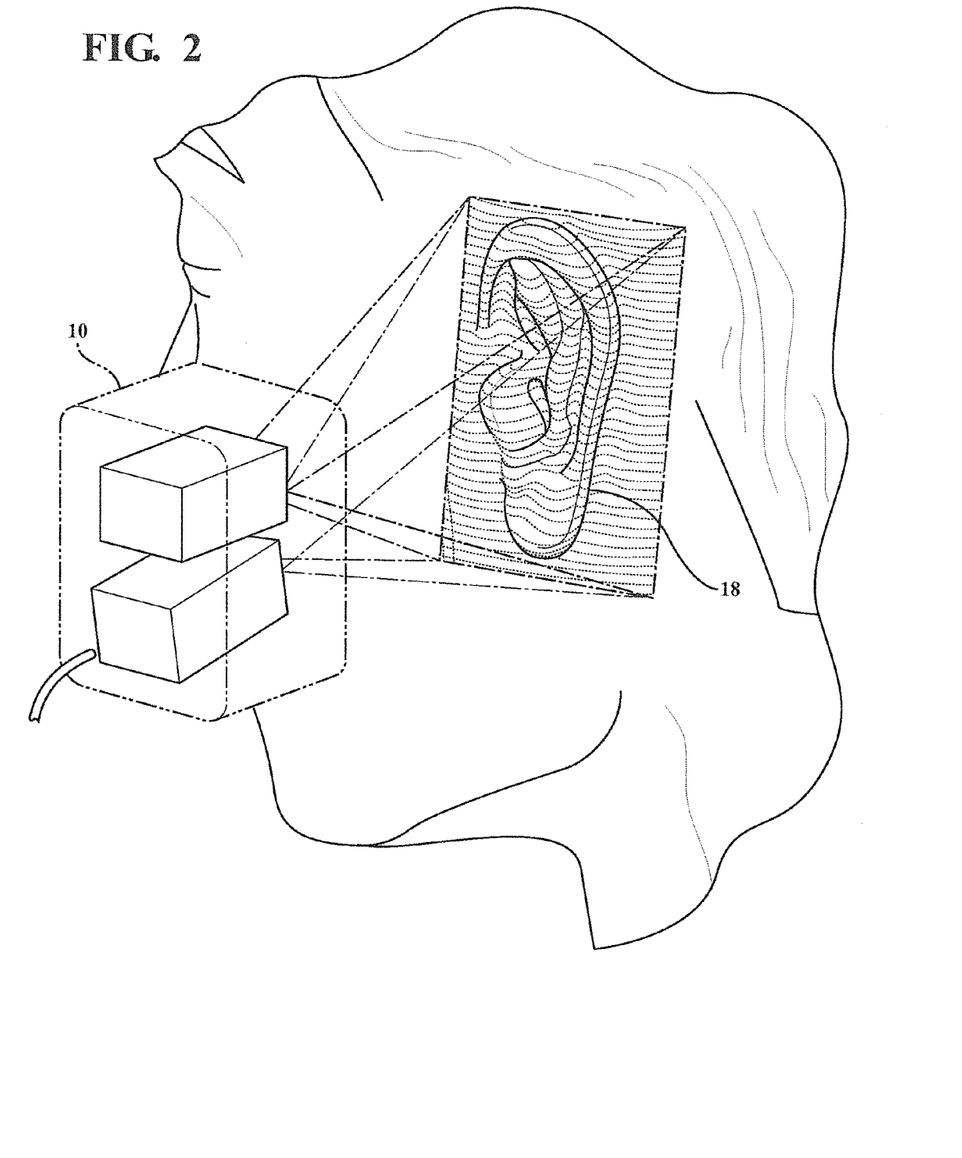
FIG. 2 is a perspective view of the apparatus of FIG. 1 showing an ear illuminated with a pattern of structured illumination.

Structured illumination, as this teuu is used herein, is a defined periodic pattern of light, typically parallel strips of light. If a flat (i.e. two dimensional) surface is illuminated with structured illumination, the pattern will appear with the predetermined pattern, as expected. If, however, a three dimensional object is illuminated with structured illumination, the periodic pattern appears distorted by the three dimensionality of the object. Referring to FIG. 2, the apparatus 10 of FIG. 1 is shown illuminating the ear 18 with an exemplary pattern of structured illumination. In this example, the pattern is a pattern of horizontal lines. Alternatively, the pattern may include vertical and horizontal lines, only vertical lines, a combination of lines, lines at other angles, as well as other patterns. As shown, because of the three-dimensionality of the ear and surrounding surfaces, the pattern appears distorted. By capturing an image of the ear illuminated with structured illumination, information about the surface contour of the ear may be determined.

In accordance with the present invention, the ear is illuminated with near-infrared illumination, and the image acquisition device captures a near-infrared image. The primary advantage of using near-infrared illumination is that it is not affected by ambient light and provides a means for accurate 3D identification of an ear. As such, the system can be used in full sunlight or in complete darkness—the final outcome of the biometric scan is not hindered. No shroud is required. Also, near-infrared illumination is invisible to the naked eye and therefore not disturbing to a human under biometric scan. Additionally, there are characteristics of human skin (reflectivity), which can be used as an additional identification and verification parameter. The present invention allows the use of particular frequencies or combinations of frequencies, further increasing accuracy of the authentication. For example, the illumination may consist of a pulse of infrared light at a particular frequency, or a series of pulses of the same frequency or different frequencies. The energy emitted in the near-infrared range is measured in microwatts and will not damage human eyes or any part of the person being scanned.

Near-infrared light is generally defined as light with a wavelength in the range of 700 to 1500 nanometers, while visible light has a wavelength in the range of 400 to 700 nanometers. For purposes of the present invention, the range of illumination that may broadly be considered near-infrared has a wavelength in the range of 600 to 1800 nanometers. Preferably, a range of 700 to 1500 nanometers is used. In some embodiments, the illumination used has a wavelength in the range of 800 to 1000 nanometers. Near-infrared illumination may be provided in a number of ways. In some embodiments, a near-infrared LED is used. In others, a xenon strobe may be used with a bandpass filter allowing near-infrared wavelengths to pass through. In yet other embodiments, a near-infrared laser or laser diode is used. Any source of near-infrared illumination may be used with the present invention.

A structured light system may be similar to a passive stereo-vision system, where one of the cameras is replaced by a projector. By projecting certain types of patterns, the correspondence of the images can be easily identified, and depth information can be retrieved by using a simple image processing (triangulation) technique. This represents one advantage that structured light has over stereo vision, in which the fundamentally difficult correspondence problem must be solved.

Structured illumination may be produced in a number of ways, and the present invention is not limited to the use of any one particular approach. In one example, near-infrared light from a light source is passed through a digital light processing (DLP) system, and the DLP creates any of a plurality of desired patterns. Other light modulating elements may also be used. In another example, light from the source is passed through a filter or mask to create the pattern. In yet another example, the structured illumination pattern may be directly created by scanning a near-infrared laser in the desired pattern. The pattern of the structured light can be varied, such as by using a single pattern or multiple patterns that are switched rapidly.

Structured light illumination can also be based on Binary coding, Intensity ratio, and/or Wave optics-based (fringe) techniques.

With binary coding techniques, depth information is obtained by projecting multiple binary coded structured infrared illumination patterns. By this method, only two illumination levels, coded as 0 and 1, may be used. Every pixel of the pattern has its own code word formed by 0's and 1's corresponding to its value in every projected pattern; thus the code word is obtained once the sequence is completed. 3D information can be retrieved based on decoding the code word. Since only 0's and 1's are used in this method, it is robust to noise. In order to increase resolution, more patterns are used, which increases the acquisition time.

Intensity ratio techniques involve codification based on linear changing gray levels, or the so-called intensity ratio method, and has the advantage of a fast processing speed because it requires only a simple intensity-ratio calculation. Usually two patterns, a ramp pattern and a uniform bright pattern, are used. Depth information is extracted from the ratio map based on triangulation. To reduce measurement noise, a Pyramidal Intensity-ratio Method can be used or a Piecewise Linear Patterns can be utilized to optimize the design of projection patterns for best accuracy. To eliminate the effect of illumination variation, an algorithm that uses three patterns can be applied.

Wave optics-based (fringe) techniques offer another approach. The concept behind interferometric shape measurement is that fringes are formed by variation of the sensitivity matrix that relates the geometric shape of an object to the measured optical phases. The resolution of the two-wavelength method depends on the equivalent wavelength ($\Lambda$) and the phase resolution of $\Lambda/200$. Another range measurement technique with high accuracy is double heterodyne interferometry, which uses a frequency shift. Interferometric methods have the advantage of being mono-state without the shading problem of triangulation techniques. Combined with phase-shifting analysis, interferometric methods and heterodyne techniques can have accuracies of $1/100$ and $1/1000$ of a fringe, respectively.

Digital fringe projection is a technique that takes advantage of digital projection technology and the phase analysis of fringe images. The fringe patterns are generated by a computer, projected through a digital display device, such as a Digital-Light-Processing (DLP) projector or Liquid-Crystal-Display (LCD) projector, onto the object being measured. 3D information can be retrieved accurately by phase analysis. This method is called a Digital Fringe Projection method. The primary advantages of digital fringe projection technology are:

1. Different shapes of patterns can be generated easily;
2. The shape of the patterns can be accurately controlled by software; and
3. The errors caused by mechanical devices for phase shifting are eliminated.

Traditional fringe projection techniques (Moiré-interferometry techniques) do not have the flexibility of changing fringe shape and size and the fringe patterns cannot be accurately generated as specified. The fringe projection method can also be regarded as a structured light method if the projected sinusoidal fringe images are regarded as structured light patterns. With all these 3D shape measurement techniques and today's advances in image acquisition and real time image processing technology, practical and highly reliable 3D ear detection becomes possible.

In some embodiments, visible light in the region of 450 to 650 nanometers can be used in addition to the near-infrared structured illumination to distinguish other features of skin texture and color (soft biometrics). Such visible light may be referred to as visible light or ambient light, even where such ambient light includes light outside the standard visible range. Additionally, visible or ambient light may be used to determine where an ear is located for analysis. A visible or ambient light image is used to define an analysis area that includes the ear so that the near-infrared image analysis may be applied to the desired region. A system in accordance with the present invention may include a source of ambient light to assist in the process.

The above-discussed source of near-infrared illumination is one module in the present invention. This module may also include a source of visible or ambient light, or a separate module may be provided for this. The present invention also includes an image acquisition module or device. This module may be integrated with the illumination module or may be separate, and the modules may be in the same or separate enclosures or supported separately.

The image acquisition device may take a variety of forms. Commercially available imaging cameras (imaging arrays), based on CCD, CID or similar technologies are adequately sensitive in and have sufficient resolution for the present application. Infrared imaging arrays (Microbolometer, Indium Gallium Arsenide (InGaAs), Indium Antimonide (InSb) or similar) also can be used for this application. The source of structured and/or visible light and the image acquisition device may each additionally include optical elements, such as filters and lenses, as necessary.

Figure 3:
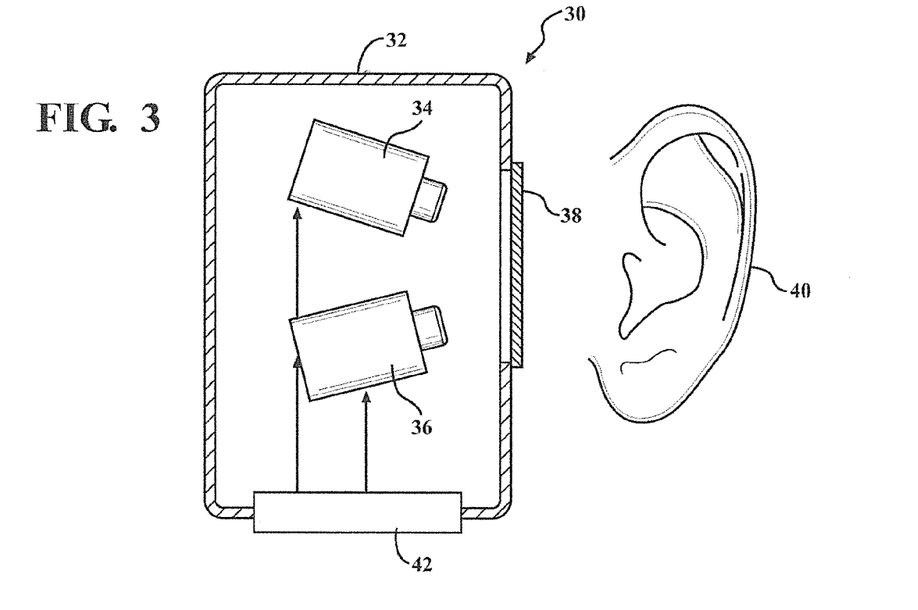
FIG. 3 is a schematic cross sectional view of another embodiment of an apparatus for biometric identification in accordance with the present invention.
Figure 4:
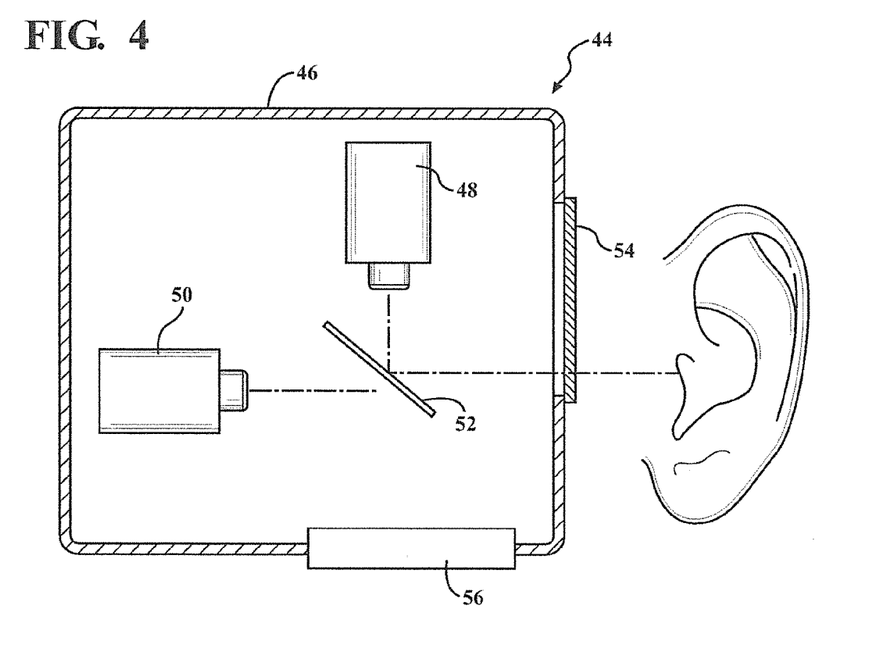
FIG. 4 is a schematic cross sectional view of yet another embodiment of an apparatus for biometric identification in accordance with the present invention.

FIGS. 3 and 4 illustrate two possible approaches to packaging the above components. FIG. 3 illustrates an off-axis system 30 with a housing or enclosure 32 and an illumination module 34 and image acquisition module 36 disposed in the housing 32. The modules 34 and 36 are angled toward one another so that both are pointed through a window 38. The window 38 may be a background rejection filter. This gives both modules a "view" of the ear 40. A third module 42 is also shown. The third module 42 houses a power supply, data interface and control system for the modules 34 and 36, and is in communication therewith. The power supply, interfaces and control systems may be distributed in different ways, with some portions being integral to the illumination module 34 or image acquisition module 36, or some portions being remotely located.

FIG. 4 illustrates an on-axis system 44 with a housing 46 enclosing an illumination module 48, an image acquisition module 50 and a mirror 52 that allows the modules to "see" the ear along a common axis through a window 54. Again, a module 56 is provided for the power supply, interfaces and control systems.

A practical implementation of the present invention can all be packaged or integrated in a very small physical volume. For example, it can be housed as an attachment to or a part of a smart phone, a tablet, laptop, personal computer, or it can be implemented as a stand-alone system in conjunction with a gate or portal or a robust and environmentally protected handheld system, which can be used in the most demanding field applications. The power requirement of this device is low enough that battery operation is feasible.

If a wired or wireless access to the Internet is possible, this device can initiate additional (enhanced) image processing operation, archiving and global communication of the outcome of the identification and authentication process.

Figure 5:
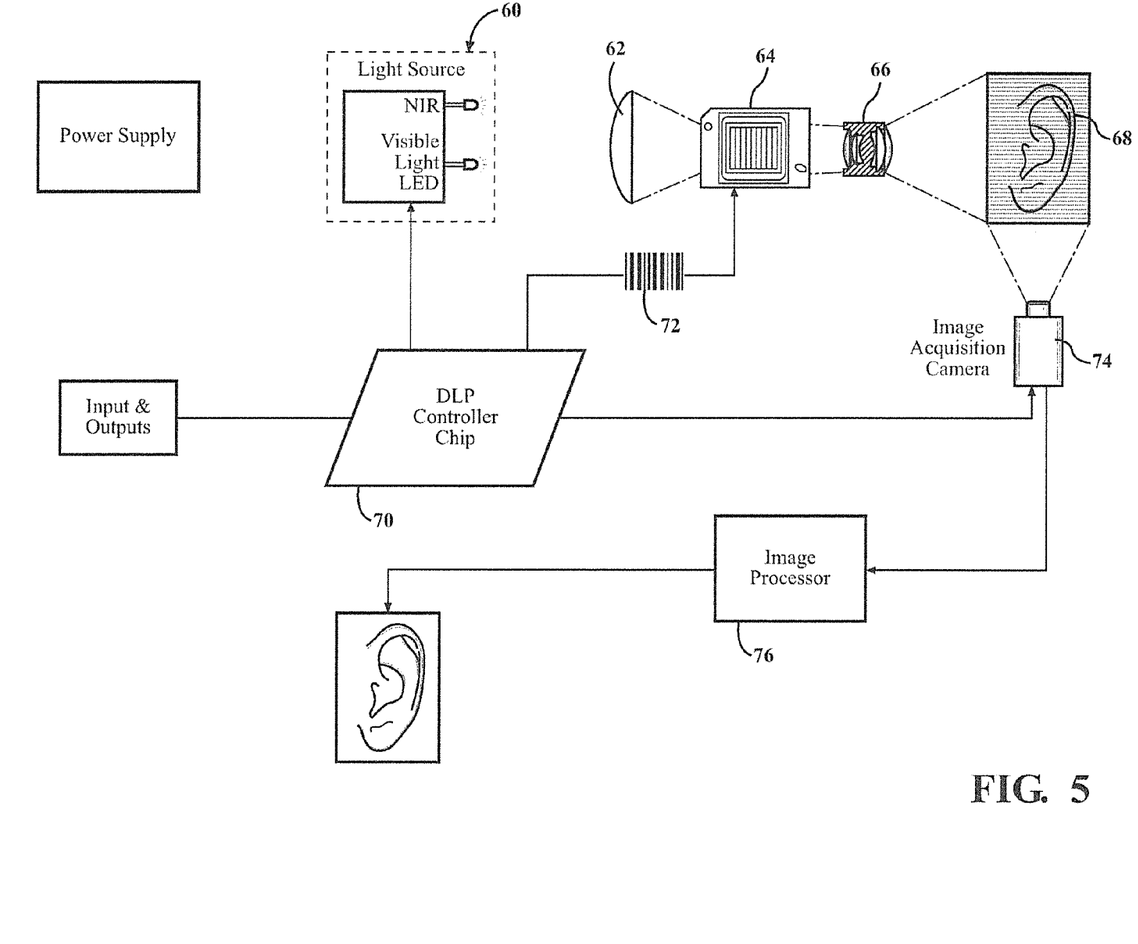
FIG. 5 is a block diagram of an exemplary embodiment of the present invention.

FIG. 5 is a block diagram of an exemplary embodiment of the present invention. It includes a light source 60 with a near-infrared (NIR) LED and a visible light LED. Light from the light source is directed through a lens 62, then a digital micromirror device (DMD) 64, then a lens assembly 66, which projects the light onto the ear 68. A DLP Controller Chip 70 controls the DMD 64, such as by sending a pattern 72. Together, the chip 70 and DMD 64 form part of a DLP system. In order to provide visible light illumination of the ear, the DMD may be set to pass all light with no pattern. Then, one or more patterns may be applied to the near-infrared light to provide the structured illumination. An image acquisition camera 74 acquires ambient and/or near-infrared images of the ear 68. The camera 74 and light source 60 may be controlled by the chip 70 to synchronize their activity with the DMD. The output from the camera is processed by an image processor 76, resulting in information necessary for identification. This is illustrated as a 3D image of an ear.

The method presented herein can be used for identification or authentication of a person where the system is presented with one or more images of the same person and the task is to provide the subject's identity (name). More generally, the system must provide an order of likelihood of identity. In addition, this system can be used for verification applications—where the system is presented with numerous images of a human ear along with another subject of identity (PIN or Name). The task is to accept or reject the claim of identity.

The equipment to provide the image includes the infrared illumination source (or sources), the illumination optics, and the imaging sensor and its related optics. These can all be packaged or integrated in a very small physical volume. For example, they may be embedded in a housing of a device such as a smart phone. An associated guide device can be used to locate the subject's ear with respect to the illumination source/imaging sensor. This guide can be a retractable structure, and may include a surrounding curtain or shield to limit or exclude ambient light, since ambient light may complicate the acquisition of visible-light imagery. The power requirement is low enough that battery operation is feasible.

If the equipment is used in conjunction with a computer or computer terminal, it can be mounted on the computer and can draw its power from the computer. If used in conjunction with a gate or portal, it can be mounted on that structure or it can be hand-held. If separate from a computer, the equipment can transmit its information to the computer by wire or by wireless means.

The imaging sensor and associated optics can include sufficient computational capability to isolate the items of interest from the overall output of the imaging sensor. However, in general the detailed analysis of these items to determine the identity of the subject will require substantial computer capability and will be done externally to the acquisition equipment.

In the present invention, image acquisition and processing may be done in a number of ways. In one approach, there are five major steps: 1) Image Acquisition and Localization; 2) Image Enhancement; 3) Feature Extraction; 4) Classification (Matching); and 5) Decision. Each of these steps will now be discussed.

The first step is image acquisition and localization. The 3D shape recognition of the ear relies upon correct and accurate segmentation of the ear from a profile image. Therefore, a robust and automatic ear segmentation algorithm is beneficial for a successful follow-up image identification. Several factors contribute to the complexity of segmenting the ear out of the initial image. First, ear size and shape vary widely from person to person. Second, there is often hair touching or partially obscuring the ear. Third, if earrings might be present, they overlap or touch the ear but should not be treated as a part of the ear. These characteristics make it difficult to use a fixed template to crop the ear shape from the image. A bigger template will include too much hair, while a smaller template will lose shape information. Also it is difficult to distinguish the ear from hair or earrings, especially when hair and earrings have similar color to skin or are very close to the ear.

After the location of the ear is determined, segmenting the ear from the surrounding is also important. Any extra surface region around the ear could affect the recognition performance. A number of established techniques from face localization are applicable for this step, including: Iconic Filter Banks [B. Takacs, and H. Wechsler, "Detection of faces and facial landmarks using iconic filter banks," *Pattern Recognition*, Vol. 30, No. 10, pp. 1623-1636, 1997.], Fischerface [P. Belhumeur, J. Hespanha, and D. Kriegman, "Eigenfaces vs. fisherfaces: Recognition using class-specific linear projection," *IEEE Trans. Pattern Analysis and Machine Intelligence*, Vol. 19, No. 7, pp. 711-720, 1997.] or an active contour (AC) algorithm [M. Kass, A. Witkin, and D. Terzopoulos. "Snakes: Active contour models", *International Journal of Computer Vision*, 1(4):321-331, 1987]. The active contour approach is particularly well suited to determining the ear region. The ear pit makes an ideal starting point. The AC algorithm grows until it finds the ear edge, and this algorithm is particularly robust in its ability to exclude earrings and occluding hair.

When the ear is segmented from the surroundings, the outlined shape is cropped from the 3D image, and the corresponding 3D data is then used as the ear image for matching. The matching algorithm achieves a rank-one recognition rate of 97.6% on a 415—subject dataset. In the case of the ear being only partially occluded by hair, jewelry, or glasses it is possible to recognize the hair and segment it out of the image.

In some embodiments, an ambient light image is utilized for localizing the ear and segmenting it from the surroundings. This may be referred to as defining an analysis area including the ear, with this analysis area being the area that will then be used in analyzing the subsequent near-infrared image.

The next major step is image enhancement. In this stage, the detected (segmented) ear is subjected to an enhancement routine that improves the fidelity of the image. Further, the ear image may be subjected to certain geometric or photometric corrections in order to facilitate feature extraction and matching. In some cases, a curve that tightly fits the external contour of the ear may be extracted. The outcome of this stage allows the correct feature descriptor vectors to be established for feature points and helps in establishing the correct point correspondence between the feature points in the image.

In the present invention, a software method of Adaptive histogram equalization (ADHist) [Zuiderveld, K.: Graphics Gems IV, chap. Contrast limited adaptive histogram qualization, pp. 474-485. Academic Press Professional, Inc. (1994)] may be used to improve the contrast of an image. This method divides an image into multiple non-overlapping tiles (regions) and performs histogram equalization for each one individually. This enhances the contrast of each tile. The neighboring tiles are combined together to create the entire enhanced image. ADHist uses bilinear interpolation to remove artificially induced boundaries while combining the tiles. Adaptive histogram equalization is capable of improving the local contrast of the image and bringing out more details in the image. The method may be expressed as follows. Let I∈Ra×b be the image of size a×b to be enhanced. It is divided into the tiles of size α×β, when α<a and β<b. These tiles are enhanced individually and stitched together to create the overall enhanced image. Selection of appropriate values for α and β greatly affects the outcome of image enhancement performance.

The next step is feature extraction. Feature extraction refers to the process in which the segmented ear is reduced to a mathematical model (e.g., a feature vector) that summarizes the discriminatory information. In some embodiments of the present invention, the feature extraction software uses a mathematical technique called wavelet analysis to translate the enhanced image of the ear into a 512-byte pattern. Wavelet analysis is a mathematical relative of the more familiar Fourier analysis, and it breaks down an image into a set of spatially limited waves. This pattern, which is referred to herein as the Ear Code, represents a map of unique ear characteristics (highly distinctive ear features). A single feature can be correctly matched with high probability against a large database of features from many images. Because the Ear Code is so short, it can be quickly compared with large databases at a rate of 100,000 codes per second or more. The entire ear scanning, feature recognition and comparison process is estimated to take less than 2 second for typical banking identification and authentication.

The next step is classification, or matching, and fusion. The features extracted in the previous stage have to be compared against those stored in the database in order to establish the identity of the input ear. In its simplest form, matching involves the generation of a match score by comparing the feature sets pertaining to two ear images. The match score indicates the similarity between two ear images. An interest point in the test image is compared to an interest point in the reference image by calculating the Euclidean distance between their descriptor vectors. Matching of two feature points is carried out using the nearest neighbor ratio matching strategy where a matching pair is detected if its distance is closer than τ times of the distance of the second nearest neighbor where τ is the matching threshold. A matching score between two ear images is obtained based on the number of matched feature points between two images. These matching scores are normalized using a min-max normalization technique and are then fused using a weighted sum rule. A final classification decision is taken by using the fused scores.

The final step is the decision. In the decision stage, the match score(s) generated in the matching module are used to render a final decision. In the verification mode of operation, the output is a "yes" or a "no", with the former indicating a genuine match and the latter indicating an impostor. In the identification mode of operation, the output is a list of potential matching identities sorted in terms of their match score. The final identification and authentication decision can be made using a single image of an ear, images of two ears, or a difference (subtraction) of images of left and right ears.

The analysis of the near-infrared image may also include determining the reflectivity of the ear. Infrared provides the ability to measure reflectivity of the human skin. Measuring reflectivity may provide additional valuable information about the subject, including how much blood flow is occurring to the ear. This may indicate if the ear is of a living subject. The method may include the step of determining if the reflectivity corresponds to an ear of a living subject, and identification and/or authentication occurs only if the reflectivity is correct.

Exemplary embodiments of the present invention may utilize any combination of the techniques and hardware described here. Some embodiments include a housing or case that is positioned adjacent to or around an ear of a subject to be identified. The housing or case may be shaped so as to shield the ear from ambient light during identification. The embodiment further includes a source of infrared structured light. One or more static or dynamic patterns of structured light may be used. The embodiments may further include one or more imaging sensors for collecting an image. Embodiments may further include processing circuitry.

All patents and publications mentioned herein are incorporated herein by reference, in their entirety. As will be clear to those of skill in the art, the herein described invention may be altered in various ways without departing from the scope or teaching of the present invention. It is the following claims, including all equivalents, that determine the scope of the present invention.

We claim:

1. A method of biometric identification and authentication of a user by imaging of an ear of the user, the method comprising:
    providing a biometric imaging system including:
        a source of near-infrared structured light operable to provide at least one structured pattern of near-infrared light;
        an image acquisition device operable to capture an ambient light image and operable to capture a near-infrared image of an ear illuminated with a structured pattern of near-infrared light; and
        a support holding the sources and the acquisition device;
    acquiring an ambient light image including the ear using the image acquisition device;
    processing the ambient light image to define an analysis area including the ear, by locating the ear in the ambient light image;
    illuminating the ear with a first structured pattern of near-infrared light from the source of structured light, the structured pattern of near-infrared light being a periodic pattern of spaced apart lines of near-infrared illumination;
    acquiring a first near-infrared image of the illuminated ear using the image acquisition device;
    setting an analysis area of the near infrared image defined by the processing of the ambient light image;
    processing the analysis area of the near-infrared image to extract identifying features;
    determining if the identifying features correspond to an authorized user;
    processing the analysis area of the near-infrared image to determine a reflectivity of the ear;
    determining if the reflectivity corresponds to an ear of a living person; and
    authenticating the user if the classified identifying features correspond to an authorized user and the reflectivity corresponds to an ear of a living person.

2. A method of biometric identification and authentication in accordance with claim 1, wherein:
    the source of near-infrared structured light is operable to provide a plurality of patterns of near-infrared light, the source comprising a near-infrared LED and a dynamic optical element or a pattern-generating mask or filter for forming the patterns.

3. A method of biometric identification and authentication in accordance with claim 2, further comprising:

illuminating the ear with a second structured pattern of near-infrared light from the source of structured light, the structured pattern of near-infrared light being a periodic pattern of spaced apart lines of near-infrared illumination; and acquiring a second near-infrared image of the illuminated ear using the image acquisition device;

wherein the processing step comprises processing the analysis area of the first and second images.

4. A method of biometric identification and authentication in accordance with claim 1, wherein:

the processing step includes the steps of:
localizing the analysis area;
enhancing the near-infrared image;
extracting identifying features from the near-infrared image; and
classifying the extracted identifying features.

5. A method of biometric identification and authentication in accordance with claim 1, wherein:

the ear of the user is at least one ear of the user, the at least one ear being selected from the group comprising a left ear, a right ear and both ears;

further comprising defining an at least one ear selected from the group as being a qualifying ear;

the step of determining if the identifying features correspond to an authorized user further including determining if the identifying features correspond to a qualifying ear.

6. A method of biometric identification and authentication in accordance with claim 1, further comprising:

repeating the illuminating with ambient light, acquiring an ambient light image and processing the ambient light image for an opposite ear of the user; and repeating the illuminating with near-infrared light and acquiring a near-infrared image for the opposite ear;

wherein the processing to extract identifying features step comprises processing the image of the ear and the image of the opposite ear to determine a difference between the ear and the opposite ear and extracting identifying features of this difference.

7. A method of biometric identification and authentication in accordance with claim 1, wherein:

the image acquisition device includes a digital imaging sensor.

8. A method of biometric identification and authentication in accordance with claim 1, further comprising:

the imaging system including a source of ambient light; and the ear is illuminated with ambient light from the source of ambient light when the ambient light image is acquired.

* * * * *